United States Patent
Hsu et al.

(10) Patent No.: US 7,717,572 B2
(45) Date of Patent: May 18, 2010

(54) ADJUSTING DEVICE FOR AN INTEGRATION ROD IN A PROJECTION APPARATUS

(75) Inventors: Wei-Po Hsu, Miao Li County (TW); Tai-Li Chang, Miao Li County (TW); Chin-Ku Liu, Miao Li County (TW); Chia-Lun Liu, Miao Li County (TW)

(73) Assignee: Coretronic Corporation, Chu Nan, Miao Li County (TW)

( * ) Notice: Subject to any disclaimer, the term of this patent is extended or adjusted under 35 U.S.C. 154(b) by 778 days.

(21) Appl. No.: 11/546,383

(22) Filed: Oct. 12, 2006

(65) Prior Publication Data

US 2007/0121080 A1 May 31, 2007

(30) Foreign Application Priority Data

Nov. 25, 2005 (TW) .............................. 94141563 A

(51) Int. Cl.
*G03B 21/14* (2006.01)
(52) U.S. Cl. ..................... 353/97; 353/102; 353/122; 353/112; 353/31; 353/37; 362/615; 362/616; 385/133; 385/901
(58) Field of Classification Search ............... 353/97, 353/112, 122, 31, 37, 53, 98, 99, 100, 119, 353/133, 102; 385/15, 34, 133, 146, 901, 385/134, 147; 362/615, 616
See application file for complete search history.

(56) References Cited

U.S. PATENT DOCUMENTS

| 7,249,857 | B2 * | 7/2007 | Lin ............................. 353/122 |
| 7,506,998 | B2 * | 3/2009 | Ansems et al. .............. 362/245 |
| 2006/0290891 | A1 * | 12/2006 | Wang et al. ................... 353/52 |

* cited by examiner

*Primary Examiner*—Georgia Y Epps
*Assistant Examiner*—Sultan Chowdhury
(74) *Attorney, Agent, or Firm*—Birch, Stewart, Kolasch & Birch, LLP

(57) ABSTRACT

An adjusting device for positioning an integration rod within an optical engine module is provided. The optical engine module includes a casing having four sidewalls defining an optical path. The integration rod is disposed in the optical path. Each sidewall has a screw hole. The adjusting device includes two adjusting screws extending through the screw holes in two adjacent sidewalls of the casing in order to abut against the integration rod, thereby adjusting the position of the integration rod in the optical path and two positioning screws extending through the screw holes in remaining two adjacent sidewalls of the casing to abut against the integration rod for immobilizing the integration rod within the casing.

8 Claims, 4 Drawing Sheets

ADJUSTING DEVICE FOR AN INTEGRATION ROD IN A PROJECTION APPARATUS

FIELD OF THE INVENTION

The invention relates to an adjusting device, and more particularly to an adjusting device for adjusting position of an integration rod within a projection apparatus.

BACKGROUND OF THE INVENTION

FIG. 1 shows a conventional projection apparatus 2, and includes a light source module 6 and an optical engine module 3. In fact, the light source module 6 is an LED light source module connected to the optical engine module 3. The LED light source module generally includes a circuit board 602 and a plurality of LED units (not shown) mounted electrically on the circuit board 602. An integration rod 8 disposed on the LED units is used for uniformly dispersing light emitted from the LED unit prior to entering the optical engine module 3.

The optical engine module 3 includes a casing 12 defining an optical path therein. After providing the integration rod 8 on the circuit board 602, a plurality of fastener screws (not shown) are inserted through the circuit board 602 and the integration rod 8 for coupling the two together such that the integration rod 8 extends into the casing 12. The integration rod 8 within the casing 12 has to be at a precise position with respect to the optical elements (such as a light valve, projection lens or optical lenses) within the optical engine module 3. Then only, the light emitted from the LED units provides the optimum optical effect. However, the optical engine module 3, the integration rod 8 and the light source module 6 have manufacturing tolerances and assembly errors during manufacturing or assembling thereof. According to the prior mounting method, the position of the integration rod 8 and the light source module 6 within the optical engine module 3 is not altered or adjusted. Thus, the integration rod 8 and the light source module 6 are not disposed precisely on the optical engine module 3 because of manufacturing tolerances and assembly errors, and consequently lower the optical effect provided thereby.

SUMMARY OF THE INVENTION

It is an object of the present invention to provide an adjusting device for adjusting position of an integration rod in a projection apparatus so as to facilitate adjustment of the position of the integration rod within an optical engine module of the projection apparatus.

In one aspect of the present invention, an adjusting device is provided for positioning an integration rod within an optical engine module of a projection apparatus. The optical engine module includes a casing having four lateral sidewalls cooperatively defining an optical path. The integration rod is disposed in the optical path. Each of the lateral sidewalls has a screw hole. The adjusting device includes a pair of adjusting screws for extending through the screw holes in two adjacent sidewalls of the casing in order to abut against the integration rod, thereby adjusting the position of the integration rod in the optical path with respect to the sidewalls of the casing and a pair of positioning screws for extending through the screw holes in remaining two adjacent sidewalls of the casing to abut against the integration rod and cooperating with the pair of adjusting screws for immobilizing the integration rod within the casing.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 1:
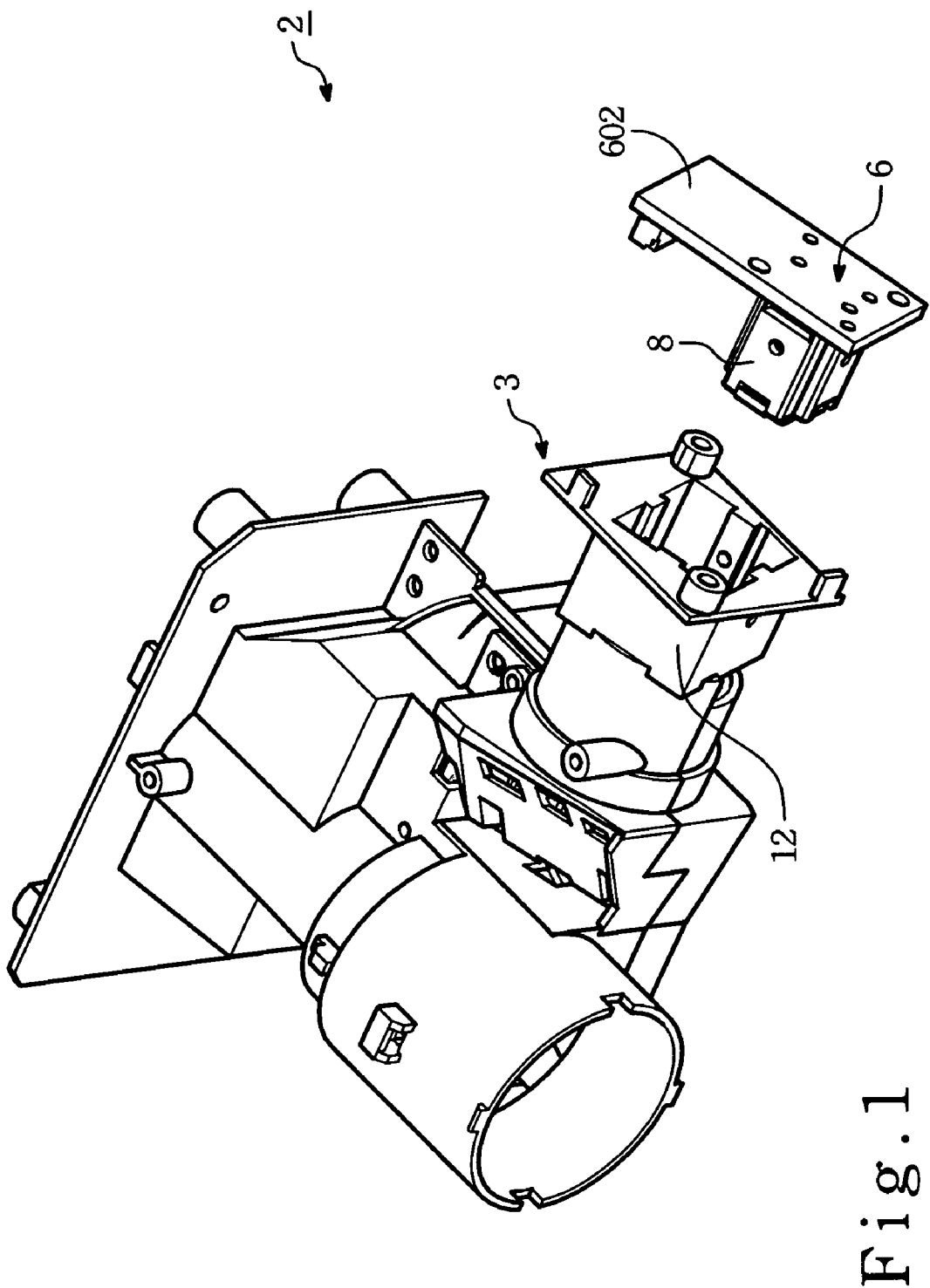
FIG. 1 is an internal view of a conventional projection apparatus.
Figure 2:
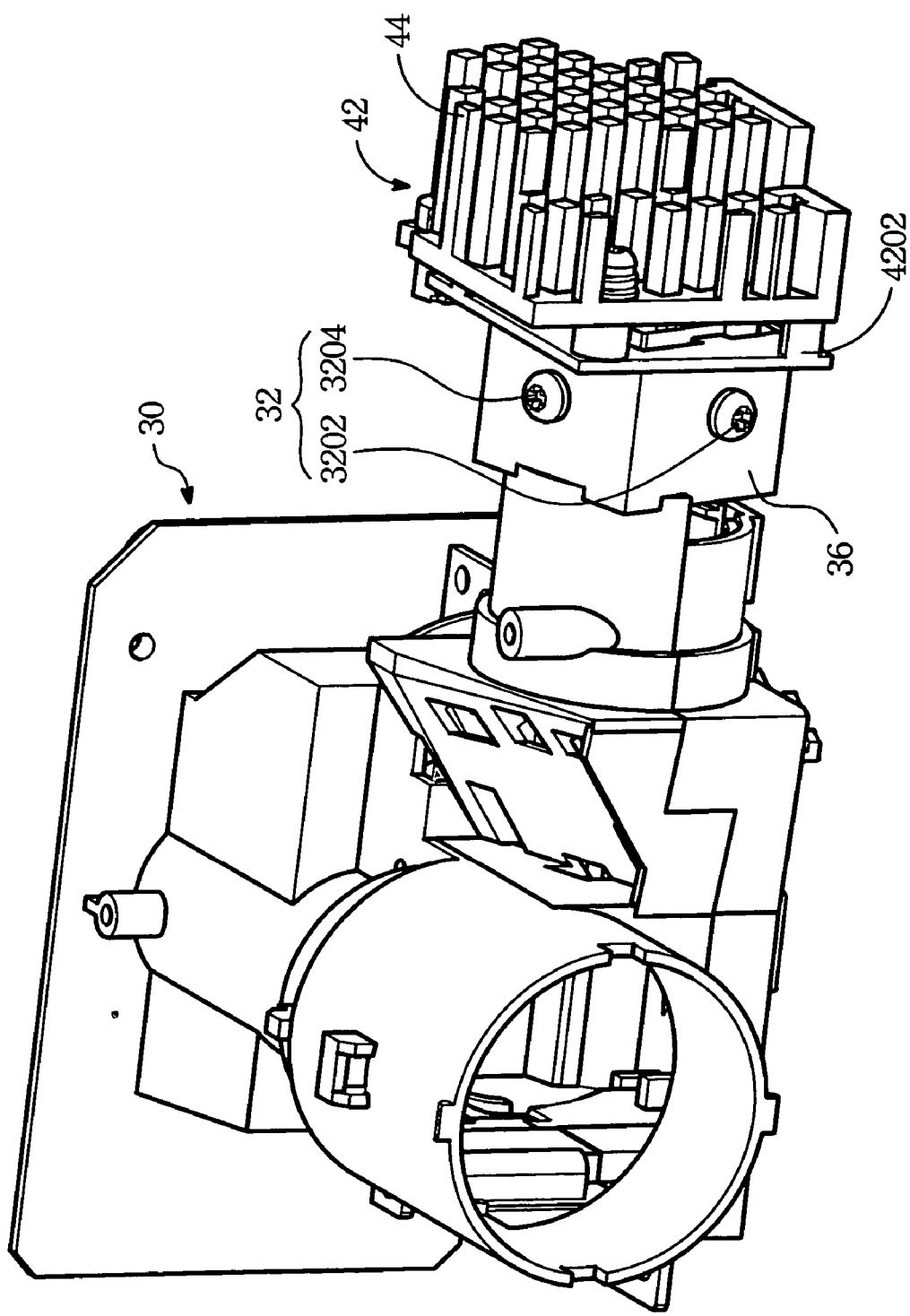
FIG. 2 is a external view of an optical engine module according to the present invention.
Figure 3:
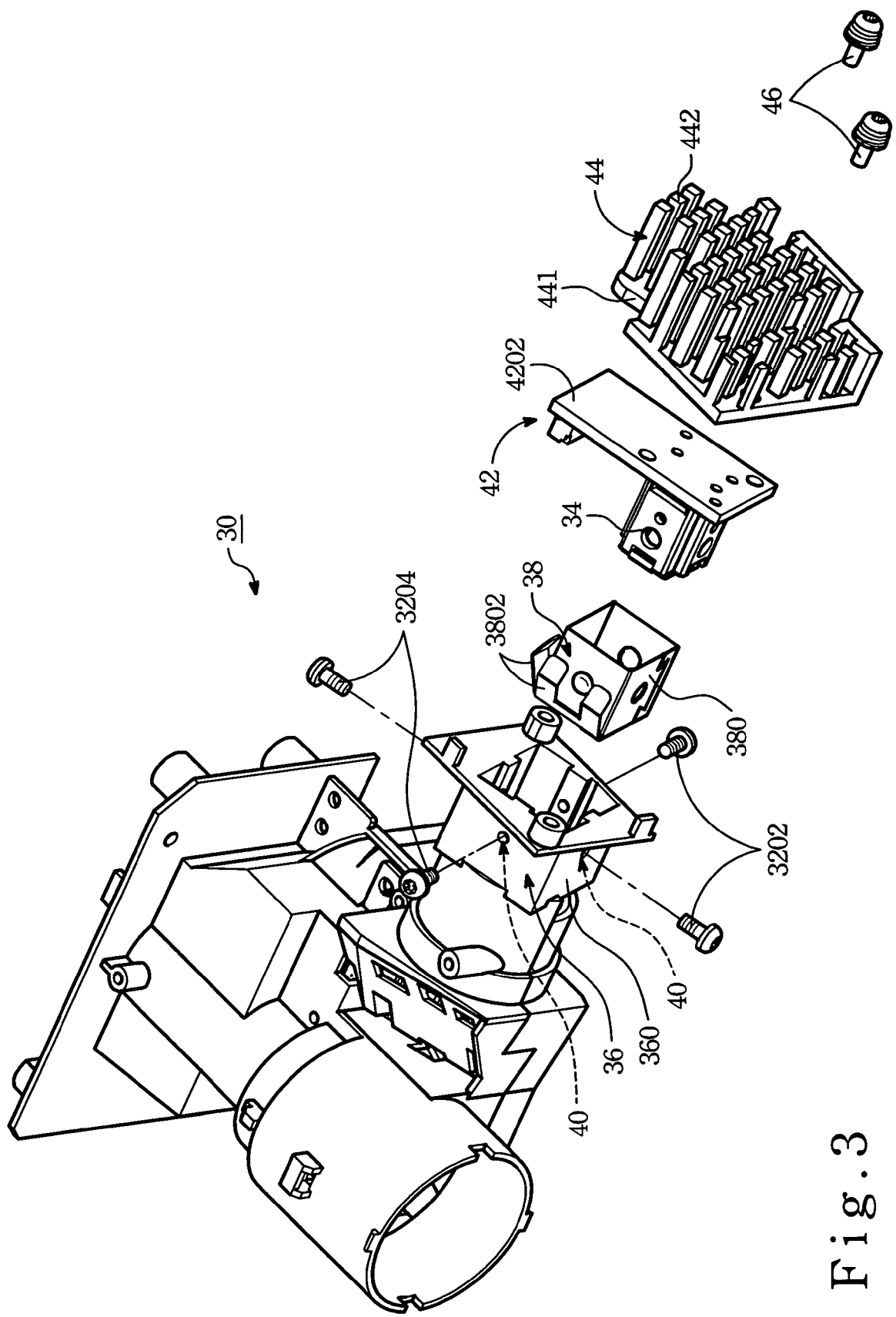
FIG. 3 is an exploded view of an optical engine module according to the present invention.

Referring to FIGS. 2 and 3, an interior of a projection apparatus of the present invention is shown. An adjusting device 32 for adjusting position of an integration rod 34 within an optical engine module 30 is provided.

The projection apparatus includes an optical engine module 30, a LED light source module 42, and the adjusting device 32. The optical engine module 30 includes a casing 36 having four lateral sidewalls 360 cooperatively defining an optical path therein, a light valve and a projection lens (not shown). The integration rod 34 is disposed with the casing 36 and extends along the optical path.

Figure 4:
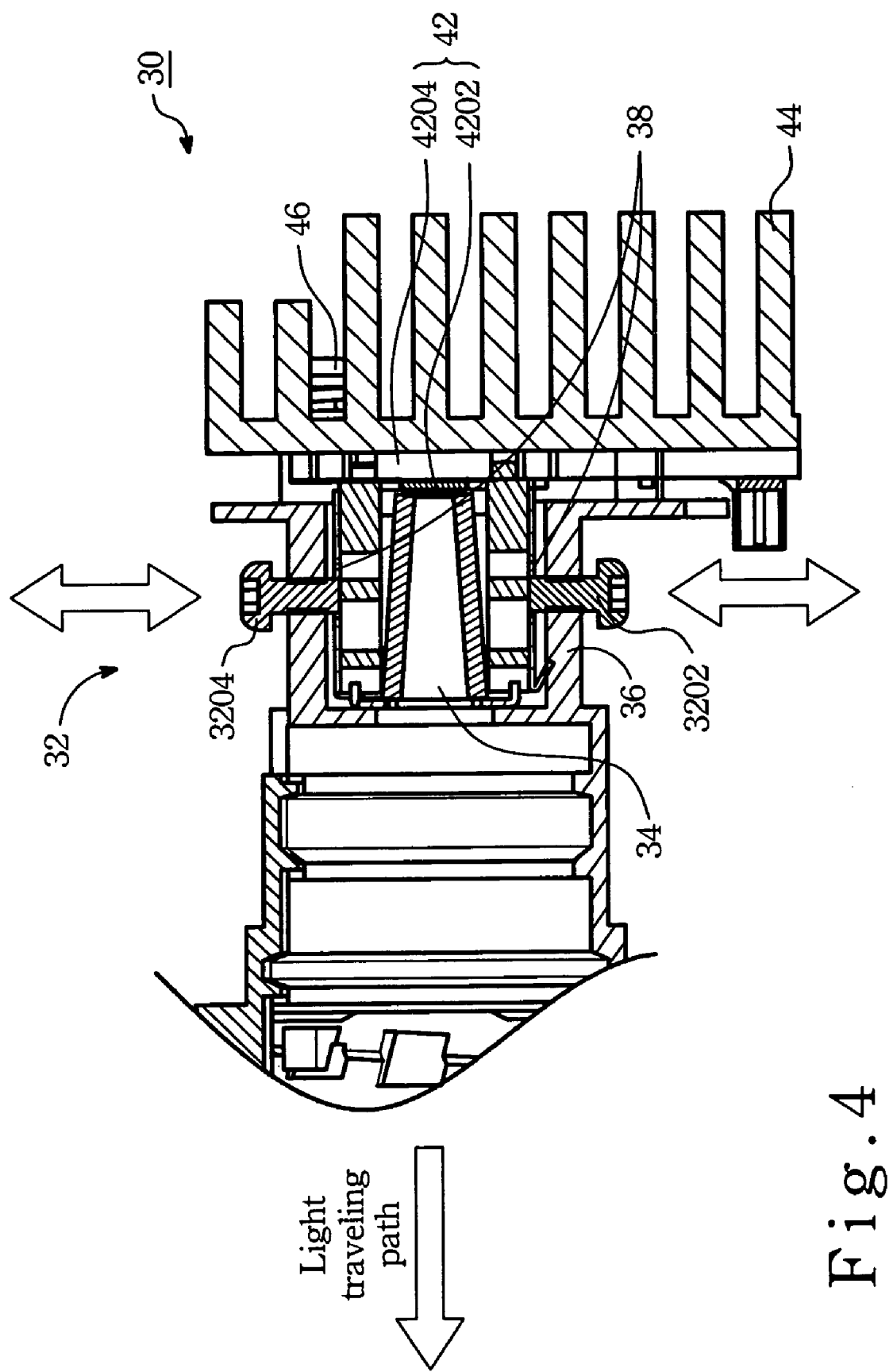
FIG. 4 is a lateral-sectional view of a casing illustrating the operation of an adjusting device according to the present invention.

Referring to FIG. 4, the LED light source module 42 is disposed at one end of the casing 36, and includes a circuit board 4202 for covering an open end of the integration rod 34 and at least one LED unit 4204 mounted on the circuit board 4202. The integration rod 34 is capable of uniformly dispersing the light emitted from the LED unit 4204.

The integration rod 34 is disposed on the casing 36. Each of the lateral sidewalls 360 of the casing 36 has a screw hole 40. A rod holder 38 is sleeved around the integration rod 34. The rod holder 38 has four lateral sidewalls 380 respectively parallel to the sidewalls 360 of the casing 36 and a plurality of flexible element 3802 protruding outwardly from the lateral sidewalls 380 to abut resiliently against inner surfaces of the lateral sidewalls 360 of the casing 36, thereby retaining the rod holder 38 in the casing 36. Each of the sidewalls 380 of the rod holder 38 is formed with a hole aligned with the screw hole 40 in the respective sidewall 360 of the casing 36.

The adjusting device 32 includes a pair of adjusting screws 3202 and a pair of positioning screws 3204. The adjusting screws 3202 are inserted threadedly through the screw holes 40 in two adjacent sidewalls 360 of the casing 36 in order to abut against the bottom surfaces of the holes in the sidewalls 380 of the rod holder 38. Further, the adjusting screws 3202 abut against the integration rod 34 through the holes of the rod holder 38, thereby adjusting the position of the rod holder 38 and the integration rod 34 in the optical path with respect to the sidewalls 360 of the casing 36. In the same manner, the positioning screws 3204 are inserted through the screw holes 40 in remaining two adjacent sidewalls 360 of the casing 36 to abut against the bottom surfaces of the holes in the sidewalls 380 of the rod holder 38. Under this condition, the positioning screws 3204 and the adjusting screws 3202 cooperatively immobilize the rod holder 38 and the integration rod 34 within the casing 36.

An important aspect to note that by varying the threaded extension degrees of the adjusting and positioning screws 3202, 3204 through the screw holes 40 in the sidewalls 360 of the casing 36, the position of the rod hold 38 and the integration rod 34 within the casing 36 is adjusted since the latter is secured on the circuit board 4202 of the LED light source module 42. In other words, the rod holder 38 is moved upward and downward direction, or leftwise and rightwise directions with respect to the casing 36 so as to alter an initial position of the rod holder 38 relative to the casing 36, thereby changing the position of the integration rod 34 within the rod holder 38.

The LED light source module further includes a cooling fin unit 44 mounted on the circuit board 4202 opposite to the LED unit 4204. The cooling fin unit 44 includes a base portion 441 fixed to the circuit board 4202 and a plurality of cooling fins 442 projecting from the base portion 441 in array manner. The cooling fin unit 44 further includes at least one screw hole and at least one fastener bolt 46. The e fastener bolt 46 is inserted threadedly through the screw hole for fixing the cooling fin unit 44 into the casing 36.

Referring again to FIG. 4, during the adjusting operation, the adjusting screws 3202 are inserted threadedly through the casing 36 from two lateral sidewalls thereof in order abut against the integration rod 34 firstly. Then the positioning screws 3204 are inserted threadedly through the casing 36 from two remaining lateral sidewalls in order to secure the position of the integration rod 34 within the casing 36.

To summarize the above paragraphs, it is observable that due to employment of the adjusting and positioning screws 3202, 3204, the integration rod 34 within the rod holder 38 is adjusted in order to dispose the best position so that the light emitted from the LED unit 4204 provide the outmost optical effect for projecting the image data.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An adjusting device for adjusting position of an integration rod within an optical engine module, the optical engine module including a casing having four lateral sidewalls cooperatively defining an optical path, the integration rod being disposed in the optical path, each of the lateral sidewalls having a screw hole facing a sidewall of the integration rod, the adjusting device comprising:

a pair of adjusting screws for extending through the screw holes in two adjacent sidewalls of the casing in order to abut against the integration rod, thereby adjusting the position of the integration rod in the optical path with respect to the sidewalls of the casing; and a pair of positioning screws for extending through the screw holes of the other two adjacent sidewalls of the casing to abut against the integration rod and cooperating with said pair of adjusting screws for immobilizing the integration rod within the casing.

2. The adjusting device according to claim 1, further comprising a rod holder for sleeving around the integration rod in order to immobilize the integration rod within said rod holder, said adjusting and positioning screws abutting against said rod holder in order to maintain the position of the integration rod within said rod holder.

3. The adjusting device according to claim 2, wherein said rod holder has four lateral sidewalls formed with four holes, each of said holes having a bottom surface, said adjusting and positioning screws abutting against said bottom surfaces of said holes in said lateral sidewall of said rod holder.

4. The adjusting device according to claim 2, wherein said rod holder further includes a flexible element protruding outwardly from said lateral sidewalls of said rod holder into the optical path to abut resiliently against inner surfaces of the lateral sidewalls of the casing.

5. The adjusting device according to claim 1, wherein the adjusting device is used in a projection apparatus that includes a LED light source module for holding the integration rod, the LED light source module including a circuit board for covering an open end of the integration rod, and an LED unit fixed on the circuit board for emitting light into the integration rod.

6. The adjusting device according to claim 5, wherein the LED light source module further includes a cooling fin unit mounted on the circuit board opposite to the LED unit.

7. The adjusting device according to claim 6, wherein the cooling fin unit includes a base portion fixed to the circuit board and a plurality of cooling fins projecting from the base portion in array manner.

8. The adjusting device according to claim 6, wherein the cooling fin unit further includes a screw hole and a fastener bolt inserted threadedly through the screw hole for fixing the cooling fin unit into the casing.

* * * * *